J. FORSLUND.
HOSE CLAMP.
APPLICATION FILED MAY 27, 1916.
1,200,601.
Patented Oct. 10, 1916.
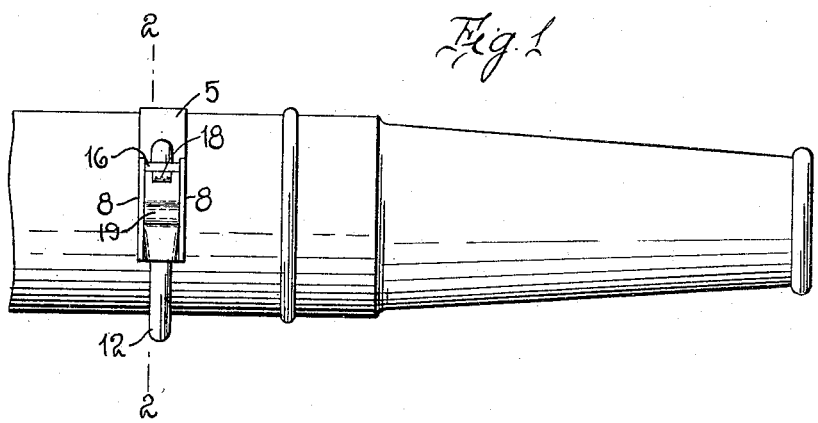
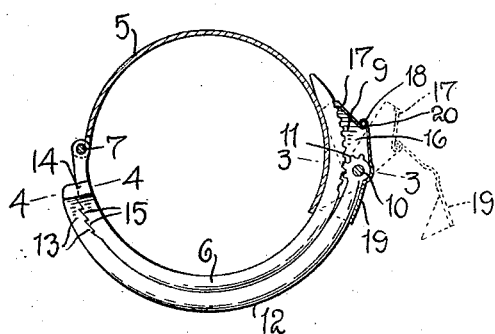
Inventor
JOHN FORSLUND

UNITED STATES PATENT OFFICE.

JOHN FORSLUND, OF ALPHA, MICHIGAN.

HOSE-CLAMP.

1,200,601.  Specification of Letters Patent.  Patented Oct. 10, 1916.

Application filed May 27, 1916. Serial No. 100,296.

*To all whom it may concern:*

Be it known that I, JOHN FORSLUND, a citizen of the United States, residing at Alpha, in the county of Iron and State of Michigan, have invented certain new and useful Improvements in Hose-Clamps, of which the following is a specification, reference being had to the accompanying drawings.

This invention relates to an improved hose clamp and has for its primary object to provide a very simple device which may be easily and quickly applied to or removed from the hose to securely clamp the hose to the nipple of a nozzle.

It is an additional object of the invention to provide a device of the above character consisting of relatively movable, hinged clamping members, manually operable means for drawing said members together upon a hose to tightly clamp the same, and means for locking the hinged clamping members against relative opening movement.

It is another and more particular object of the invention to provide manually operable means mounted upon the free end of one clamping member to operatively engage the corresponding end of the other member and move the same with respect to the first member, a pivoted dog to engage the second named clamping member and hold the same in its adjusted position, and means for protecting the adjusting and locking means for the clamping member and obviating the accumulation of mud or dirt thereon.

With the above and other objects in view, my invention consists in the novel features of construction, combination and arrangement of parts to be hereinafter more fully described, claimed and illustrated in the accompanying drawing, in which, Figure 1 is a side elevation showing my improved hose clamp in its applied position; Fig. 2 is a section taken on the line 2—2 of Fig. 1; Fig. 3 is a section taken on the line 3—3 of Fig. 2; Fig. 4 is a section taken on the line 4—4 of Fig. 2; and Fig. 5 is a detail perspective view of the manually operable member.

Referring in detail to the drawing, 5 and 6 designate the two sections of the metal clamping band, the section 5 being relatively wide and provided upon one of its ends with spaced knuckles between which a single knuckle on one end of the other band section 6 is adapted to be disposed. These knuckles receive a suitable hinge pintle 7. Upon the other end of the band section 5, the spaced laterally disposed ears 8 are formed on the opposite edges thereof. The free end of the other band section 6 is movable upon the outer face of the section 5 between these ears, and is provided upon its outer surface with a series of teeth 9. The ends of a pin 10 are fixed in the ears 8, and upon said pin the mutilated pinion 11, formed upon one end of an operating rod 12, is loosely mounted. The teeth of this pinion have meshing engagement with the teeth 9 on the end of the clamping band section 6. The rod 12 is of substantially semi-circular form and the free end portion thereof is flattened and provided with the teeth 13 on its inner face. Angularly disposed snap flanges 14 are also formed upon the opposite edges of this flattened end portion of the operating rod for engagement over the longitudinal edge portions of the clamping band section 6, the outer face of which is toothed or serrated, as at 15, for engagement by the teeth 13 on the end of the operating rod.

A substantially U-shaped locking dog 16 has its parallel portions loosely mounted upon the pin 10, the intermediate connecting portion of said dog being obliquely disposed, as at 17, and adapted for engagement at its outer edge with the teeth 9 on the clamping band section 6. At the outer edge of this obliquely disposed portion of the locking dog, a sleeve or knuckle 18 is formed, upon the opposite sides of which spaced knuckles, formed on the end of a guard plate 19, are arranged. These knuckles receive the hinge pintle 20 whereby the guard plate is mounted for swinging movement relative to said dog. This guard plate has its opposite longitudinal edges flanged to extend downwardly over the operating rod 12 and the clamping band section 6 so as to protect the mutilated pinion and the teeth on the end of the band section 6 and prevent mud, stones, and other foreign matter entering between the ears 8 and collecting thereon.

From the foregoing description, the construction, manner of operation and several advantages of my invention will be clearly and fully understood. In applying the clamping band to the hose, the curved operating bar 12 is swung outwardly and the dog 16 raised so that the end of the band section 6 may be drawn outwardly between the ears 7 on the other band section and said band slipped over the nozzle and upon the end of the hose. The free end of the band section 6 is then forced inwardly and the rod 12 manipulated so that the teeth of the mutilated pinion 11 will coöperate with the teeth 9 on the end of the band section 6 and force said band section inwardly with respect to the section 5. The locking dog engaging the teeth 9 will prevent the separation of the band sections after the same are tightened upon the hose. The curved operating rod is finally forced inwardly upon the band section 6 and the flanges 14 on the free end thereof snap over or clamp upon the opposite edges of the band section 6 while the teeth 13 on the end of the rod interlock with the teeth 15 on said band section. Thus, the operating rod is securely held in close engagement upon the clamping band and possibility of its accidental outward movement and breakage or injury thereof when the hose is dragged over the ground is thus lessened. The shield or guard plate 19 also effectively protects the mutilated pinion on the toothed end of the band section 6 so that its proper operation at all times may be assured. It will, of course, be understood that when it is desired to remove the clamp from the hose, the above operation is reversed, the free end of the rod 12 being pulled outwardly and the dog 16 disengaged from the teeth 10 on the band section 6 so that the free ends of the band sections may be separated.

From the above, it will be seen that I have produced a very simple, effective and durable hose clamping device which may be easily and quickly operated and, when once applied to the hose, is not liable to accidental release or detachment when the hose is roughly handled or thrown against obstructions, or dragged over the ground. The device may, of course, be constructed in various sizes and the sections of the clamping band may be otherwise formed than illustrated in the accompanying drawing. The device is also susceptible of many other modifications in the form, proportion and arrangement of the several elements employed and it is, therefore, to be understood that I reserve the privilege of adopting all such legitimate changes as may be fairly embodied within the spirit and scope of the invention as claimed.

Having thus fully described my invention, what I desire to claim and secure by Letters Patent is:—

1. A hose clamp including band sections hingedly connected together at one of their ends, the free end of one of said band sections being slidably engaged on the corresponding end of the other band section, a manually operable element mounted upon said latter band section to coöperatively engage the free end of the first named band section and positively contract the band section upon a hose, and a dog pivotally mounted upon the free end of the second named band section for coöperative engagement with the end of the other band section to hold the latter section in its contracted position.

2. A hose clamp including two band sections hingedly connected together at one of their ends, one of said band sections having teeth formed on its free end and the other section being provided with spaced ears between which the toothed end of the first named section is slidably disposed, a mutilated pinion mounted between said ears for engagement with the teeth on said band section, said pinion being provided with an operating rod, means on said operating rod adapted for coöperative engagement with the first named band section to hold the pinion against rotation in one direction and retain the band sections in contracted engagement upon the hose, and a locking dog mounted between the ears on the second named band section for engagement with the teeth on the first named band section.

3. A hose clamp including two band sections hingedly connected together at one of their ends, one of said band sections having teeth formed on its free end and the other section being provided with spaced ears between which the toothed end of the first named section is slidably disposed, a mutilated pinion mounted between said ears for engagement with the teeth on said band section, said pinion being provided with an operating rod, means on said operating rod adapted for coöperative engagement with the first named band section to hold the pinion against rotation in one direction and retain the band sections in contracted engagement upon the hose, a locking dog mounted between the ears on the second named band section for engagement with the teeth on the first named band section, and a guard plate hingedly connected to said dog and extending between the spaced ears over said pinion and the teeth on said band section.

In testimony whereof I hereunto affix my signature in the presence of two witnesses.

JOHN FORSLUND.

Witnesses:
MYRTLE A. GARRIGAN,
S. E. BRACEGIRDLE.